United States Patent [19]

Saleeb et al.

[11] Patent Number: 4,820,534

[45] Date of Patent: Apr. 11, 1989

[54] FIXATION OF VOLATILES IN EXTRUDED GLASS SUBSTRATES

[75] Inventors: Fouad Z. Saleeb, Pleasantville; John G. Pickup, Peekskill, both of N.Y.

[73] Assignee: General Foods Corporation, White Plains, N.Y.

[21] Appl. No.: 205,532

[22] Filed: Jun. 10, 1988

Related U.S. Application Data

[63] Continuation of Ser. No. 945,180, Dec. 16, 1986, abandoned, Continuation of Ser. No. 768,100, Sep. 23, 1985, abandoned, Continuation-in-part of Ser. No. 591,150, Mar. 19, 1984, abandoned.

[51] Int. Cl.$^4$ .................... A23L 1/221; A23L 1/222
[52] U.S. Cl. ................................ 426/96; 426/650; 426/651
[58] Field of Search .................. 426/96, 650, 651

[56] References Cited

U.S. PATENT DOCUMENTS

| | | | |
|---|---|---|---|
| 3,704,137 | 11/1972 | Beck | 426/651 |
| 4,004,039 | 1/1977 | Shoaf et al. | 426/96 X |
| 4,388,328 | 6/1983 | Glass | 426/659 X |
| 4,689,235 | 8/1987 | Barnes et al. | 426/89 |
| 4,707,367 | 11/1987 | Miller et al. | 426/96 |

*Primary Examiner*—Joseph Golian
*Attorney, Agent, or Firm*—Thomas R. Savoie; Daniel J. Donovan

[57] ABSTRACT

The present invention provides a method for fixing volatiles in an extruded glass substrate. A minor component consisting of a low molecular weight water-soluble carbohydrate or food acid is dry-blended with a major component consisting of a high molecular weight water-soluble polymeric carbohydrate in a ratio of from 10% to 30% low molecular weight carbohydrate or adipic, malic or citric acids or combinations thereof to at least 70% high molecular weight material. A volatile flavorant like orange oil or acetaldehyde is combined with this substrate mixture. The dry-blended admixture is extruded so that the temperature of the material in the extruder is at or above the melting point of the minor ingredient and above the glass transition state of the substrate. The free-flowing powder is relatively non-hygroscopic and possesses a high fix.

15 Claims, No Drawings

FIXATION OF VOLATILES IN EXTRUDED GLASS SUBSTRATES

This application is a continuation of application Ser. No. 945,180, filed Dec. 16, 1986, now abandoned, which is a continuation of Ser. No. 768,100, filed Sept. 23, 1985, now abandoned, which is a continuation-in-part of Ser. No. 591,150, filed Mar. 19, 1984, now abandoned.

TECHNICAL FIELD

The present invention generally relates to a method for fixing volatile flavorants in a food-approved substrate, and more particularly to a low-temperature methodology for fixing volatile flavorants in an extruded "carbohydrate-glass" substrate.

The problems involved in the storage and utilization of volatile flavorants, and specifically essential oils, in dry form, are greatly complicated by the extreme sensitivity of substrate constituents to the effects of heat, light, air and moisture. Therefore, there has been a longstanding need for a food-approved encapsulation substrate which is essentially solid and moisture-stable. A promising technique to solve the problems attendant to the fixation of highly volatile flavorants, is via encapsulation of the highly volatile flavorant in a moisture-stable substrate. One such method is by extrusion, although spray-drying of flavors with a dextrin or other carbohydrate substrate is a common technique.

U.S. Pat. No. 3,041,180 issued to Swisher discloses a method for fixing flavorants in an extruded carbohydrate substrate according to the following methodology. The product of the Swisher invention is obtained by emulsifying an essentially water-insoluble essential oil with a molten mixture of glycerol and corn syrup solids as the continuous phase, extruding the emulsified mass in the form of filaments into a cold fluid, preferably an organic solvent for the essential oil which is a nonsolvent for the corn syrup solids, followed by impact breaking of the solidified filaments into small particles of usable form and then holding the particles in the solvent, preferably for an extended period, to remove essential oil from the surfaces of the particles together with a substantial portion of the residual moisture contained on and in the particles. This methodology is conducted in excess of 130° C.

U.S. Pat. No. 3,704,137 to Beck discloses a method for preparing an essential oil composition. His method involves the cooking of an aqueous solution of sucrose and hydrolyzed cereal solids until it is at a boiling point of about 122° C., and the water level reaches a desired minimum. At this point, the heating is stopped, the mixture is agitated, and an emulsifier is added. The emulsifier is necessary in order for a homogeneous solution to form. While the solution is cooling, the essential oil and an antioxidant are added, and are intimately mixed. The final mix is forced through an extruder under air pressure. At this point, about 0.5% by weight of the final composition of an anticaking agent is added to prevent the particles from sticking.

U.S. Pat. No. 4,004,039 to Shoaf et al. discloses a process for the encapsulation of APM in any number of matrix forming materials. The product is formed by creating a hot metal which, upon cooling, is capable of forming a relatively amorphous matrix within which the APM is discretely dispersed.

SUMMARY OF THE INVENTION

The present invention provides a methodology for fixing a volatile flavorant in an extruded "carbohydrate-glass" substrate. Moreover, the present method enables the following: maintaining the admixture at high temperatures is not necessary; emulsifiers or glycerin-type plasticizers are not required; volatiles or essential oils may be dry-blended (i.e., no added moisture) at ambient temperatures directly with the components of the substrate or metered into the dry substrate materials; the addition of anticaking agents is not required.

The method employed herein relies solely on the melting of the minor component as the substrate passes through the extruder in order to form a glass. Temperature within the extruder is regulated so that the temperature of the material in the extruder is above the glass transition state of the substrate but at or just above the melting point of the minor component, the low molecular weight water-soluble ingredient which may be a low molecular weight carbohydrate, a food-acid or combinations thereof, comprising from about 10% to about 30% of the substrate. Good results have been found when the minor component comprises about 25% of the substrate. For example, when one uses maltose monohydrate and a malto-dextrin having a D.E. (dextrose equivalent) of about 10, the temperature within the zones of the extruder are set at or below 100° C. Maltose monohydrate has a melting point of about 102°-103° C. and this temperature is obtained due to the friction of the material within the extruder itself. The glass transition temperature of the substrate mixture is less than the melting point of the low molecular weight ingredient.

To employ the present methodology, one mixes the minor component and the major component with a volatile flavorant. The minor component is a low molecular weight (90-500 molecular weight) water-soluble carbohydrate or food acid material. The carbohydrate may be a crystalline structure, but it is not a requirement. This minor component is responsible for from about 10% to about 30% by weight of the substrate. The major component, which is at least 70% by weight of the substrate mixture, is a material which contains at least 95% high molecular weight polymeric carbohydrate material having an average molecular weight above 1,000. The major and minor components are admixed or dry-blended with the volatile flavorant that one wishes to encapsulate. There is no need to add moisture to the dry-blended mixture. This is a change from the processes previously known and practiced in the art, where moisture was added in amounts to comprise up to 25% of the pre-extrusion mixtures.

The dry-blended admixture is then extruded, the extruder temperature being set as described below. Unlike other methods, the present invention involves exposing both substrate and volatile flavorant to relatively short periods of elevated temperature. The resultant product is a hard, homogenous glass, with a final moisture content of approximately 3-6%. This contrasts with the prior art which exhibited moisture levels in excess of 6%. The product herein also exhibits glass transition temperatures ($T_g$; as measured by a Differential Scanning Calorimetry) in the area of 50° C., which is well above ambient temperature (25°-35° C.). This also contrasts with prior art products which exhibit glass transition temperatures below room temperature, e.g. 15° C. Furthermore, when a glass material is exposed to humid air at temperatures above its glass transition temperatures, it will pick up moisture faster, soften, being to dissolve and tend to stick or cake in a closed system. However, upon exposure to ambient conditions the product of the present invention remains a hard, glass structure which retains flavorants up to levels of 15% by weight of the substrate, exhibits low levels of hygroscopicity, and is of high density after the extrudate is ground. The fact that the product exhibits low levels of hygroscopicity is desired in that the product remains moisture-stable and free-flowing without the need to add anti-caking agents. This property differentiates the present invention from the prior art which exhibits higher levels of hygroscopicity and therefore necessitates the use of anti-caking agents and special packaging to remain moisture-stable.

DETAILED DESCRIPTION

The present methodology includes the steps outlined hereinbelow, wherein the ingredients are dry-blended or admixed and extruded through an extruder the temperatures of which are set within a critical temperature range. The substrate is comprised of a minor component, comprising from about 10% to about 30% by weight of the substrate, and a major component, comprising at least 70% by weight of the substrate. The minor component is a low molecular weight (90 to 500 molecular weight) water-soluble material, such as a low molecular weight carbohydrate. The preferred low molecular weight carbohydrates are: fructose, glucose, maltose and mannose. The major component is a water-soluble polymeric carbohydrate material containing predominately high molecular weight constituents; an example is maltodextrin. The maltodextrin should possess less than 5% monosaccharides and disaccharides by weight, and preferably has a D.E. of from less than 5, typically to 20, with the preferred D.E. of about 10.

A class of materials which may be operatively substituted for the low molecular weight carbohydrates are food-approved acids, as they display similar utility. For purposes of the present invention, food-approved acids shall include adipic acid, citric acid and malic acid. Alternately, these acids may be combined with the low molecular weight carbohydrate, to form the minor component. An illustrative combination of ingredients for use in the present invention is LO-DEX 10, a maltodextrin, maltose monohydrate and orange oil.

The minor and major components are dry-blended with the volatile ingredient, which typically has a boiling point in the range of from about 20° C. to about 200° C. The term dry-blended is defined herein to means the absence of any added moisture, but recognizes that the substrate components and volatile ingredients may themselves contain small percentages of moisture.

The dry-blended mixture is extruded through an extruder, the zones of which are set within a critical temperature range. Although the type of extruder appears to be immaterial, for purposes of the present invention, a Brabender Extruder (manufactured by Brabender Corp., South Hackensack, N.J.) will be used for illustrative purposes. The extrusion, carried out within a Brabender extruder, is characterized by a zonal temperature differential.

The critical temperature range is determined by examination of the glass transition state of the substrate and the melting point of the minor ingredient. The extrusion must be carried out at a temperature which is higher than the glass transition temperature of the substrate, otherwise the desired "glass" product will not form. The temperature of extrusion also depend upon the melting point of the minor ingredient. It is a necessary component of this process that the minor ingredient melt. As it melts, the major component will dissolve into the minor component and form a solid solution. During this process, the volatile flavorant becomes molecularly dispersed within the molten mass, and upon cooling, a homogenous, single-phased glass results. However, in order to maximize the amount of volatiles which are fixed within the glass product, the set temperature of the extruder should be kept as low as possible. As a result, the temperature of the zones of the extruder, excluding the diehead zone, are set at or below the melting point of the minor ingredient. The set temperature of the extruder is not necessarily equal to the actual temperature of the material in the extruder, due to the heat of friction, which is why the set temperature may be below the melting point of the minor ingredient, but the minor ingredient will still melt. Preferably, the set temperature will not be more than 30° C. below the melting temperature of the minor ingredient. The critical temperature range then is dependent upon the actual temperature of the material within the extruder, which must be above the glass transition state of the substrate and at or above the melting point of the minor ingredient.

The diehead zone of the extruder must be treated separately. Although the same product goal applies, fixing the maximum amount of volatiles by optimizing the temperature, other factors come into play. The size of the die aperture plays a role in determining the temperature at which the diehead is set. As the size of the aperture decreases, the possibility of the diehead clogging increases. In order to facilitate the outflow of the extrudates it is sometimes necessary to increase the diehead temperature above the temperature which would give maximum volatile fixation. It is believed that the short amount of time that the extrudate would be subjected to the elevated temperature of the diehead would have only minimal effect on the volatile content of the final product, but in order to maximize the amount of volatile in the product, the diehead temperature should be set at the lowest possible temperature above the melting point of the minor ingredient which does not result in the clogging of the diehead, preferably not more than about 10° above the melting point of said minor ingredient.

The volatile flavorants shall be characterized for purposes of the present invention as essential oils or low boiling point volatiles. For example, in orange oil, the volatile constituents include acetaldehyde, terpenes, esters, and alcohols. In the present method, other volatiles or essential oils may be operatively substituted herein.

The examples set out hereinbelow, are for illustrative purposes and are not meant to in any way limit the present invention.

EXAMPLE 1

125 g of maltose-monohydrate (Sigma Chemical Co., St. Louis, Mo., $T_g=44°$ C.) and 375 g of LO-DEX 10 (manufactured by Amaizo, American Maize Products Company, Hammond, Ind., $T_g=115°$ C.) were mixed in a five-quart Hobart-type mixer (manufactured by Hobart Inc., Hawthorne, N.Y.). 20 ml (17.6 g) of ethylbutyrate was added to the abovestated combination. The whole system was allowed to mix for an additional 1.5 minutes. During the mixing period the blending apparatus was covered to minimize volatile loss, if any. The homogenous mixture was placed in the feed end of the extruder. The type of extruder was a Brabender multi-zoned extruder. This type of extruder possesses a single screw within a 0.75 inch diameter barrel. This type of extruder employs independently controlled temperature zones, with the die-head temperature being elevated above barrel temperature as a result of friction and as a means of assuring unimpeded outflow of the extrudate. Extrusion conditions are as follows:

|  | Zone Number: | | | |
| --- | --- | --- | --- | --- |
|  | I | II | III | Die |
| Temperature: | No Heat | 98° C. | 98° C. | 105° C. |

The glass transition temperature of the substrate mixture is about 80° C. The extruder has a screw ratio of 2:1, a one-quarter inch die and a shear rate of 60 rpm. The admixture was fed through the extruder so that a uniform rope was obtained which was allowed to cool to ambient temperature. The product was a very homogenous, glassy material wherein flavor was entrapped. Chemical analysis (gas chromatography) was conducted showing little flavor loss after extrusion. The initial ethylbutyrate fix by the extrusion method was found to be 3.5% by weight and after 3 days having been ground (to −16+ 25 U.S. Sieve screen mesh sizes) the fix remained at this level.

EXAMPLE 2

125 g mannose (M.P. 133° C. $T_g=30°$ C.) and 375 g of LO-DEX 10 were mixed together for 3 minutes to which 20 g of lemon oil (terpeneless, lot #2347 from Citrus and Allied Essenses, Ltd., Floral Park, N.Y.) was mixed for 2 minutes. The mixture was extruded in a Brabender extruder. The operative conditions follow:

|  | Zone Number: | | | |
| --- | --- | --- | --- | --- |
|  | I | II | III | Die |
| Temperature: | 60° C. | 120° C. | 130° C. | 125° C. |

A screw ratio of 2:1 was used with a die measuring 0.25 inches having a shear rate of 80 rpm. The product was a stable, glassy structure wherein the initial lemon oil fix was 3.6% by weight and after 3 days of open storage in a ground (−16+ 25 U.S. Sieve mesh size) condition the fix was found to be stable at 3.3% by weight.

EXAMPLE 3

125 g maltose-monohydrate and 375 g LO-DEX 10 were mixed together for 3 minutes, to said mixture 20 g of orange oil (terpeneless, lot #3358 from citrus and Allied Essenses, Ltd., Floral Park, N.Y.) was added and mixed for 2 minutes. The homogenous mixture was extruded in the Brabender extruder under the following conditions.

|  | Zone Number: | | | |
| --- | --- | --- | --- | --- |
|  | I | II | III | Die |
| Temperature: | 50° C. | 100° C. | 100° C. | 105° C. |

A screw ration of 2:1, and a 0.25 inch die with a shear rate of 60 rpm was applied. The resulting product was a hard, glassy structure which was found to have an initial fix of 2.5% by weight. 10 grams of the ground material was put into an open beaker and retained therein for 3 days after which the fix was found to be stable at 1.8% by weight.

EXAMPLE 4

To study the effect of extrusion variables on fixation of orange oil the following example was carried out using high maltose corn syrup (HMCS, $T_g=70°$ C., 1.8 percent moisture), and citric acid. Dry high maltose corn syrup (HMCS) solids was obtained first by spray drying the syrup with 30% (wt.) LODEX 10 in an Anhydro dryer. This dry solid will be called HMCS mix.

614.3 g LODEX 10, 285.7 HMCS mix (70% HMCS+30% Lodex 10) and 100 g citric acid monohydrate ($T_g=11°$ C.), were blended together (dry powder) as in Example 1. 52.6 g of orange oil (terpeneless, lot #2395 from citrus and Allied Essences, Ltd.) were added to the dry mix and blended together for an extra 3 minutes. Extrusions were made using a multiple hole die (∼1/16" diameter holes) with a single screw Brabender type extruder. The zone and die temperatures were fixed at present conditions to study the efficiency of retaining the orange oil. On extrusion, followed by cooling cord-like (∼⅛") strands were obtained which could be easily broken into small pieces. The leve lof orange oil was analyzed after extrusion. The data is given in Table I.

TABLE I

| Extruder Zone Area | I | II | III | Die | Fixed Orange oil Level |
| --- | --- | --- | --- | --- | --- |
| Run #A | 35° C. | 80° C. | 90° C. | 120 | 4.64% |
| B | 35° C. | 80° C. | 90° C. | 110 | 3.10% |

The temperatures given in Table I are the temperatures at which the zones of the extruder were set, and the actual temperature at the diehead at the time of Run B may have been higher.

EXAMPLE 5

2716 g of LO-DEX 10 and 1087 g high maltose corn syrup (HMCS) mix (70% HMCS and 30% LO-DEX 10 See Example 4) were dry mixed for 2 min. in a Hobart bowl. 200 g of orange oil (terpeneless) were added to the dry mix and all were blended together for an additional 2 min. (covered bowl). Extrusions were made using a multiple hole die with a single screw Brabender type extruder. Very uniform cord-like strands (∼2 mm diameter) were obtained after extrusion with varying orange oil retentions depending on the extrusion condition as outlined in Table II:

TABLE II

| Run # | Extruder Zone Temperature | | | | Fixed Orange Oil wt. % |
| --- | --- | --- | --- | --- | --- |
|  | I | II | III | Die |  |
| A | 25° C. | 60° C. | 80° C. | 120–125° C. | 1.71 |
| B | 25 | 60 | 80 | 115–117 | 3.14 |
| C | 25 | 60 | 80 | 104–105 | 2.79 |
| D | 25 | 60 | 80 | 98–100 | 4.71 |
| E | 25 | 60 | 80 | 130 | 1.98 |
| F | 25 | 60 | 90 | 118–120 | 3.00 |

It is evident that excessively high die temperatures (>120° C.) should be avoided for efficient orange oil fixation. In fact, exceeding the melting point of the minor ingredient even for short periods of time decreases the ability for the substrate to fix volatile flavorants.

We claim;

1. A method for fixing volatile flavorants in an extruded, glass, moisture-stable substrate at a level which is effective to impart flavor to a food composition comprising the steps of:
   (a) preparing a homogeneous mixture of a substrate and a volatile flavorant without any added moisture, said substrate being comprised of about 10% to about 30% by weight of a minor component, said minor component having a molecular weight of from 90 to 500 and consisting of water-soluble carbohydrates having a melting point of from about 80° C. to about 180° C., adipic acid, citric acid, malic acid and combinations thereof, and at least 70% by weight of water-soluble, polymeric, carbohydrate material which contains at least 95% polymeric carbohydrate material having an average molecular weight above 1,000;
   (b) heating said homogeneous, dry-blended mixture within a screw extruder such that the temperature of the mixture in the extruder is above the glass transition temperature of the substrate and at or just above the melting point of the minor ingredient, such that the minor ingredient melts and the major component dissolves into the minor component to form a molten mass; and
   (c) extruding the molten mass through a diehead and cooling the extruded material to produce an amorphous, homogeneous, single-phase glass with entrapped volatile flavorant, said glass having a glass transition temperature above ambient temperature.

2. The method of claim 1 wherein the extruder is a single screw extruder.

3. The method of claim 2 wherein the polymeric carbohydrate possesses less than 5% by weight monosaccharides and disaccharides.

4. The method of claim 1 wherein the glass transition temperature of the glass is above 35° C.

5. The method of claim 4 wherein the glass transition temperature is about 50° C.

6. The method of claim 4 wherein the moisture content of the cooled glass is approximately 3 to 6%.

7. The method of claim 4 wherein the diehead temperature is set not more than 10° C. above the melting point of the minor ingredient.

8. The method of claim 7 wherein said minor component is chosen from the group consisting of fructose, maltose, mannose, glucose and combinations thereof.

9. The method according to claim 8 wherein the polymeric carbohydrate material is a malto-dextrin having a dextrose equivalent up to 20 D.E.

10. The method of claim 8 wherein the dry-blended mixture does not contain an emulsifier.

11. The method of claim 8 wherein the substrate consists of 10 to 30% of said minor component and 70% to 90% of said polymeric carbohydrate material.

12. The product produced by the method of claim 8.

13. The product produced by the process of claim 10.

14. The product of claim 13 wherein no anticaking agent is present.

15. The method of claim 1 wherein the polymeric carbohydrate material is a maltodextrin having a dextrose equivalent up to 20 D.E.

* * * * *